June 10, 1941.  H. L. M. J. DE PLACE  2,245,467
DRIVING MECHANISM BETWEEN ROTARY ELEMENTS
Filed July 27, 1939  4 Sheets-Sheet 1

June 10, 1941.   H. L. M. J. DE PLACE   2,245,467
DRIVING MECHANISM BETWEEN ROTARY ELEMENTS
Filed July 27, 1939   4 Sheets-Sheet 2
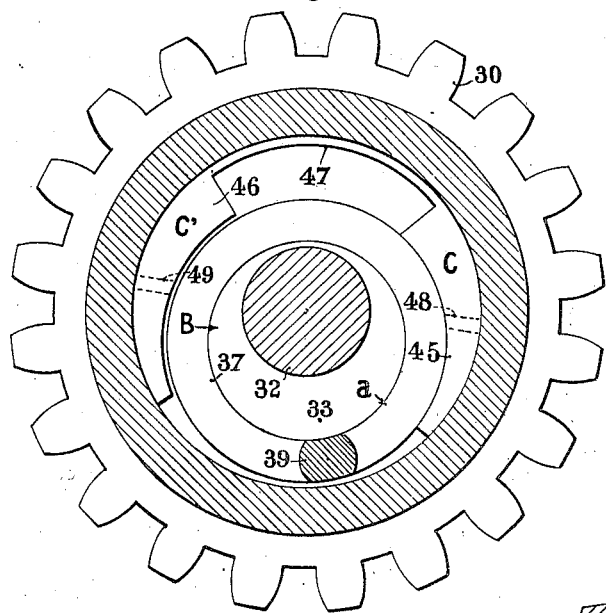
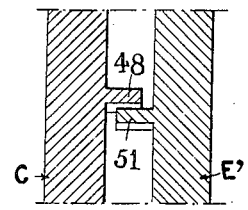
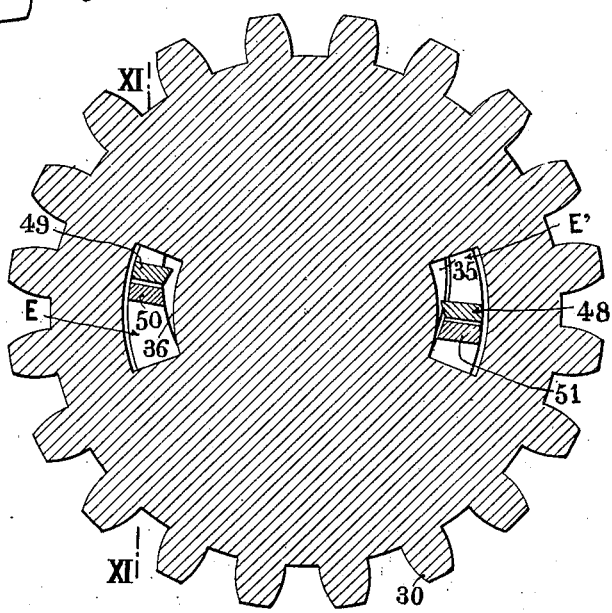
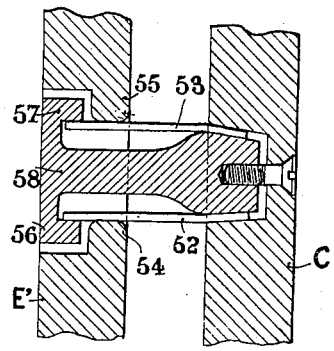

June 10, 1941. H. L. M. J. DE PLACE 2,245,467
DRIVING MECHANISM BETWEEN ROTARY ELEMENTS
Filed July 27, 1939 4 Sheets-Sheet 3

Inventor,
H. L. M. J. de Place
By Glascock Downing & Seebold
Attys.

June 10, 1941.  H. L. M. J. DE PLACE  2,245,467
DRIVING MECHANISM BETWEEN ROTARY ELEMENTS
Filed July 27, 1939  4 Sheets-Sheet 4

Inventor,
H. L. M. J. de Place
By Glascock Downing &c.
Attys.

Patented June 10, 1941

2,245,467

UNITED STATES PATENT OFFICE 2,245,467

DRIVING MECHANISM BETWEEN ROTARY ELEMENTS

Henri Leon Marie Joseph de Place, Paris, France

Application July 27, 1939, Serial No. 286,922
In France July 29, 1938

8 Claims. (Cl. 74—389.5)

The invention relates to driving mechanisms to be interposed between a driving rotary member and several driven members adapted to rotate in certain cases at different speeds. Said mechanisms can more particularly be used as differentials for motor vehicles.

In order to remedy the inconveniences of usual differentials having planet pinions, in particular when one of the driving wheels is on slippery ground, devices have alreadly been proposed for avoiding the prejudicial reactions exerted by a driven member on another driven member and allow, however, said members to rotate at different speeds, for instance, when turning.

In the devices proposed up to now, the driven members were usually driven by friction, for instance, by means of buttressing rollers, pawls, or friction rings, etc. The overrunning operation being ensured by mechanisms acting on the driving members themselves (rollers or pawls) for putting them in and out of action.

These friction driving devices have the inconvenience of necessitating considerable pressures sometimes exerted on very small bearing surfaces. Consequently, they must comprise members which are very strong, heavy and of high cost price. Moreover, the bearing surfaces of said devices wear or become hammered rather rapidly.

On the other hand, in friction driving mechanisms, the engagement is not usually instantaneous. Owing to the slight slope of the driving inclines and to the considerable pressures they place on materials which are always more or less resilient or distortable, the driving is effectively ensured by the major part of said devices only after a movement of more or less substantial amplitude. Furthermore, slipping is still to be feared especially if the members are lubricated.

Now, in safety overrunning differentials, for obtaining, when running straight ahead, a satisfactory distribution of the stresses between the driving wheels and an instantaneous correction of the deviations of the vehicle, indispensable for well holding to the road, it is necessary to ensure a very rapid engagement.

The present invention has for its object improvements in safety overrunning differentials, in order to avoid the above mentioned inconveniences of known devices.

According to the present invention the driving of the driven members of the differential is ensured by a combination of mechanisms having a positive driving action and instantaneous engagement presenting new characteristic features.

This differential mechanism comprises, generally speaking, a normally driving member, at least two driven members, auxiliary members positively rotatively connected to said driven members, but capable of moving non-concentrically relatively to the latter, wedges of two reverse directions serving to ensure the rotary driving of the driven members by the driving member, and vice-versa, and means for automatically putting said wedges out of action in a suitable manner.

The invention more particularly contemplates certain simple and rugged embodiments of the differential and certain means for putting the wedges out of action in the desired direction in particular by means of suitable connections provided between the wedges determining the driving in reverse direction of two different driven members or by using the relative displacement of two members serving to actuate the driving member of the differential.

Several embodiments of devices according to the invention are illustrated by way of example only in the accompanying diagrammatic drawings.

Figs. 2 and 3 are cross sections made according to lines II—II and III—III of Fig. 1.

Fig. 4 is a partial cross section made according to line IV—IV of Fig. 3.

Figs. 5 and 6 show in plan view devices for controlling the wedges.

Figs. 1 to 11 relate to mechanisms comprising a normally driving member B and co-axial members A and D, normally driven.

In practice, in the embodiments described hereinafter, the wedge C or C' or E or E' is arranged between the driven member A or D and an auxiliary member (or a plurality of other members) $a$ or $d$ also rotatively driven by said member but capable of having a suitable movement.

These three members—driven member, auxiliary member and wedge—form a unit which is rendered undistortable in a definite direction and which comprises an incline complementary to another incline rigid with the driving member B. Said inclines, as they cannot move apart by construction, are driven one by the other in a positive manner.

In reverse direction, the whole of said three members distorts continuously, the obstacle tending to be disengaged, so that the driving action is impossible.

Each driven member comprising in the differential two driving devices of reverse directions, it will be understood that the driving can take place as well for reverse as for forward running and that the engine could be used as brake.

In a turn it is however necessary that the outer wheels should be capable of freely accelerating.

According to Figs. 1 to 8, this result is obtained in the following manner:

The obstacle ensuring the driving of one of the wheels in a definite direction is connected, in a suitable manner, to the obstacle ensuring the driving of the other wheel (or of the other wheels) in the reverse direction so that both obstacles under consideration cannot simultaneously determine the locking of their respective connections.

In these conditions, the engagement can never take place in reverse directions for two different wheels.

In a turn, as the inner wheel exerts a resistant stress, the corresponding obstacle is firmly clamped and held stationary in locked position, the opposite obstacle of the other wheel, urged by relatively slight friction to come into locking position, cannot do so, the outer wheel in the turn cannot therefore drive the driving member as long as the other wheel opposes a resistance, and will freely accelerate.

In reverse, the operation will be absolutely identical owing to the symmetry of the device.

When the engine is used as brake, the inner wheel in the turn can, on the contrary, freely slow down. Returning springs can be provided tending to restore all the obstacles of the same direction in a symmetrical position so that when one wheel offers a resistance, the obstacles ensuring the driving of the other wheels in the same direction will always remain in locked position, ensuring thereby an instantaneous engagement.

Figure 9:
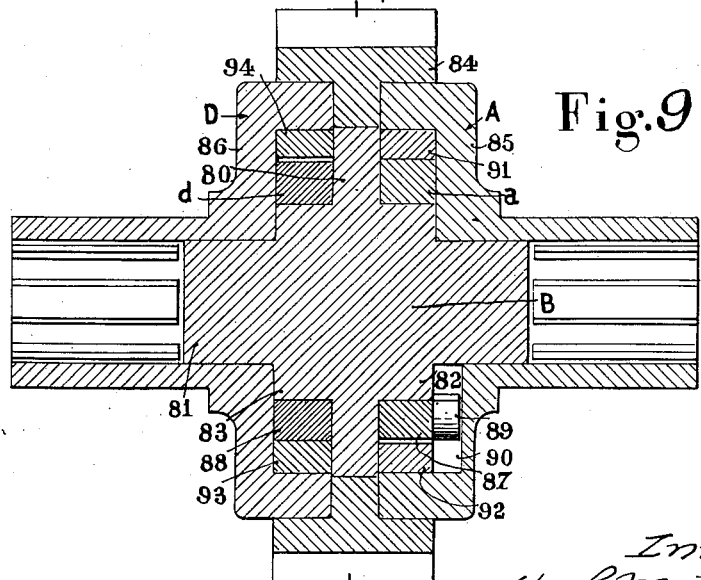
Fig. 9 is an axial section of another embodiment.
Figure 10:
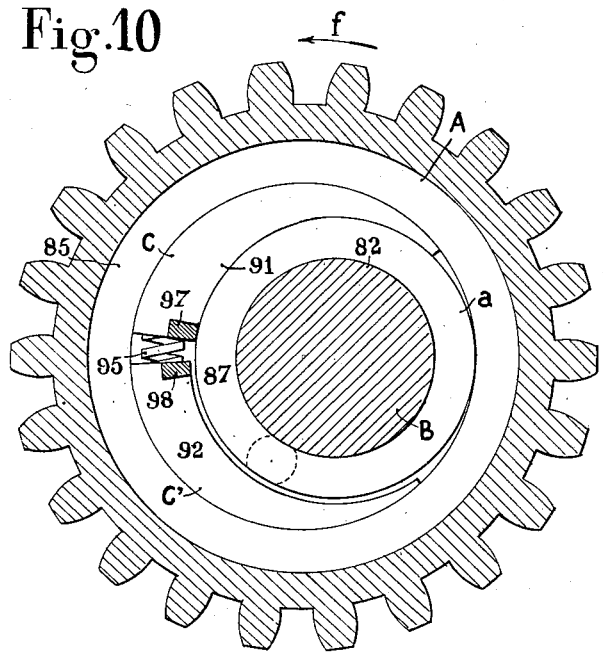
Figs. 10 and 11 are cross sections made according to lines X—X and XI—XI of Fig. 9.
Figure 11:
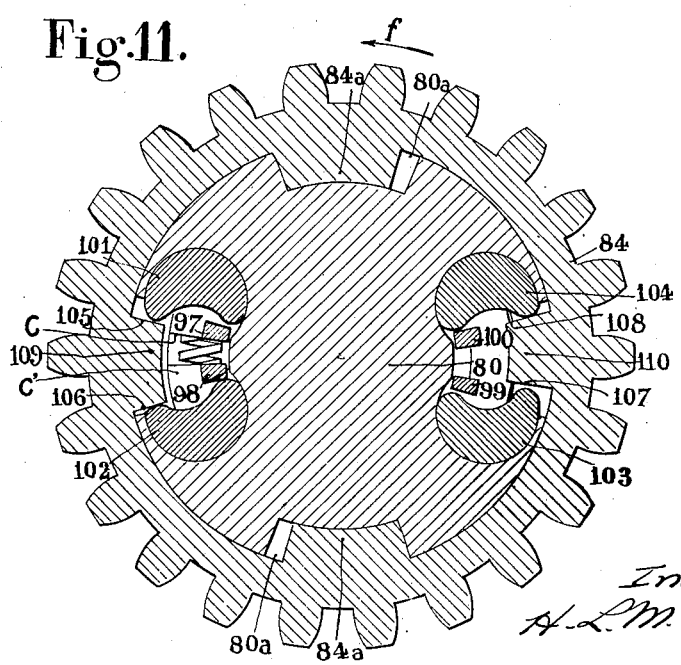

According to Figs. 9 to 11, the putting out of action of the wedges is produced by the relative displacement of two members serving to drive the member which is normally the driving member of the differential.

The device according to the invention can comprise any number of driven members. In particular, use can be made of a single device of this kind for a vehicle comprising more than two driving wheels. It suffices in this case that a single wheel exerts a resistant stress in order that all the other wheels should accelerate freely, independently of each other. In a vehicle of this kind, use may be made of several devices of the same type or else they can be combined with differentials having planet pinions.

Declutching or ordinary free wheel running in a definite direction can also be very simply determined, by locking the obstacles in the desired position, for instance by means of a suitable locking system.

In the embodiment shown in Figs. 1 to 4, the driving member B is constituted by a toothed wheel 30 rigid with a plate 31 carrying a central shaft 32 and two circular eccentric bosses 33 and 34 offset to the extent of 180 degrees for obtaining a natural balancing. Said bosses are placed on either side of the plate 31 in which are provided two apertures 35, 36, diametrally opposed.

Two circular collars 37, 38 are mounted with slight friction on eccentric bosses and laterally carry a small spindle 39.

The driven members are constituted by driven drums 41, 42 adapted to be respectively rendered rigid with the shafts of wheels through flutes 43. Said drums mounted on the shaft 32 also fit at their periphery in the rim of the toothed wheel 30. A radial slideway 44 in which the finger 39 of the corresponding collar can slide, is provided in the cheek member of each drum 41 or 42.

The wedges C C' E E' are constituted by curved quoins 45, 46 connected in pairs by means of an intermediate blade 47 and placed between the collars and the inner rim of the drums. Each pair of wedges can prevent, through one or the other of its branches (according to the direction of rotation) the displacement of the collar relatively to the corresponding drum. The wedges are mounted with great friction in the drums and tend to be driven thereby. For that purpose, the blade 47 has a sufficient resiliency.

Said wedges CC' EE' respectively carry lateral abutment fingers 48, 49, 50, 51 allowing to couple them with slight play through the apertures 35, 36 of the central plate.

The wedges of each pair have such a shape that they can simultaneously come in contact with the respective collar.

Their surfaces may be striated for increasing the adherence and facilitating the ejection of the film of oil.

The different members of the differential can be held assembled by the abutments or the ball bearings of a casing (not shown) which encloses the mechanism.

When the toothed wheel 30 is driven by the engine in a given direction each of the eccentric bosses 33 or 34 tends to move the corresponding collar 37 or 38 which abuts against one of the wedges. The latter is trapped as in a jaw between the collar and the rim of the drum. As the finger 39 of the collar prevents the latter from rotating relatively to the drum, the collar, the wedge and the drum form an undistortable block if the eccentricity is sufficiently small relatively to the diameter of the collar. The complementary block of the eccentric boss is therefore driven thereby positively and without any possible slipping.

The finger 39 of the collar is only subjected to a reduced stress owing to the pressures which are exerted between the wedge, the drum and the collar.

In a turn, when the outer wheel tends to accelerate, the jaw formed by the drum and the collar tends to open and to release the branch previously locked, of the wedge.

On the contrary, the corresponding wedge of the inner wheel in the turn, the only driving wheel, remains firmly clamped.

The abutment fingers 48, 49, 50, 51 coupling both pairs of wedges hold the released wedge stationary relatively to the locked wedge and consequently relatively to the boss 33 or 34. The slight play provided between said abutment fingers (Fig. 3) facilitates the free wheel operation, without however allowing the opposite branch of the wedge to become locked in reverse direction. The outer wheel in the turn can therefore freely accelerate.

When both wheels tend to simultaneously accelerate, both pairs of wedges are released but, driven by their friction against the drums, they immediately become locked in reverse direction. The engine is therefore driven by the wheels and can be used as brake. In this case the inner wheel can freely slow down in a turn. The differential being symmetrical, it operates as well in reverse as in forward running. For free wheel running, the disengagement is effected without any effort, as no wedging is possible.

In fact, owing to the thickness of the collar 37 or 38 the eccentricity is proportionally much greater relatively to the diameter for the eccentric bosses 33 or 34 than for the periphery of the collars. The bosses can therefore disengage instantaneously and easily even if the opening angle of the wedges is small and ensures a perfect locking.

Bearings (needle bearings for instance) can moreover be provided between the bosses and the collars, the driving being ensured not by friction but by eccentricity. Bearings might moreover also be provided between the driving member and the driven drums.

In their turn the wedges are released by the spacing apart of the jaws without slipping, no wear can therefore be produced.

This embodiment is particularly rugged as the rim of the toothed wheel reinforces that of the drums. It will also be seen that the central plate cooperates with the cheek members of the drums for maintaining the centering of the rims at each of their ends, thereby avoiding any overhanging stress.

Apart from the advantages inherent to safety free wheel differentials which are sufficiently known, the differential having a positive driving action above described has, in particular, relatively to buttressing roller devices, the following advantages:

(a) Great simplicity and consequently low cost price. This design comprises, in fact, only seven members which can be easily machined.

(b) Large bearing surfaces avoiding all hammering.

(c) Positive driving avoiding all slipping and allowing more reduced pressures, as the driving is not ensured by friction.

Buttressing roller differentials necessitate on the contrary considerable pressures which are exerted on very small bearing surfaces.

(d) Practically no wear. The latter might moreover be prejudicial to satisfactory operation.

(e) Great ruggedness as the device comprises no delicate member.

(f) Reduced cumbersomeness and weight.

(g) Extremely easy assemblage and taking to pieces.

(h) Engagement more rapid than with buttressing rollers which only practically ensure the driving after a more or less important rolling movement.

The road-holding qualities are improved thereby.

Fig. 5 shows that instead of simple abutments with play such as 48, 49, 50, 51, use can be made for connecting the wedges CC' and EE' of one or more resilient connections; the latter comprise two spring blades 52, 53 one end of which is secured to a wedge C for instance and the other end normally presses against a boss 54 or 55 of the opposite wedge E'. Said springs tend to restore both wedges in an identical position and, consequently, to engage the wedge of one wheel in the same direction as the wedge of the other wheel.

In order that the actions of both springs are not antagonistic in the vicinity of the mean position, it is advantageous to provide a device checking the action of each spring upon expansion, when the mean position is passed. For that purpose the action of each spring 52 or 53 is for instance checked by abutments 56 or 57 rigid with a coupling finger 58 secured to the wedge C. For avoiding the reactions of one wedge on the other, they can also be connected by an irreversible connection or a connection having a locking position in the vicinity of the position of engagement.

Figure 1:
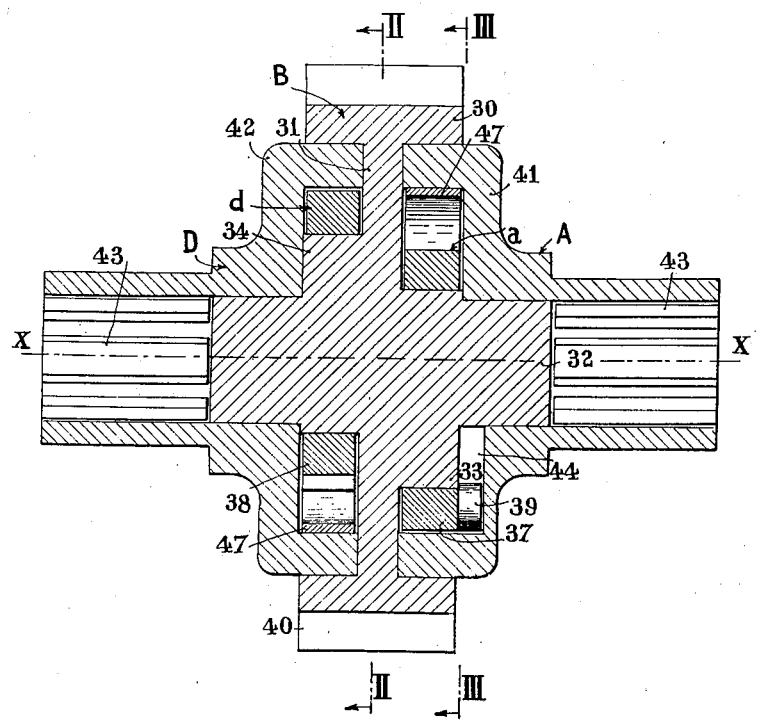
Fig. 1 is an axial section of an embodiment comprising a driving member and two driven members.
Figure 6:
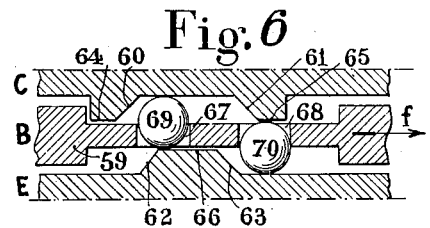

Fig. 6 shows an example of this kind: the driving member B comprises a cheek member 59 and the wedges C and E which are to be connected are placed on either side of said cheek member.

Each of the wedges carries at least two inclines 60, 61, 62, 63 of reverse directions and having plane or flat faces 64, 65, 66, extending from the apex of said inclines; the driving member B is perforated with openings 67, 68 in which are freely housed balls 69, 70 cooperating with said inclines and flat faces.

When the driving member B rotates in the direction of the arrow f, as both driven members exert a resistance, the device is in the position illustrated: the balls 69, 70 are locked by the flat faces 66 and 65. In a turn, if one of the wheels accelerates, the corresponding obstacle C moves slightly, this allowing free wheel operation. However the movement is limited by the incline 60 which abuts on the ball 69 so that the obstacle cannot engage in reverse direction. The ball 69 locked on the flat face 66 can exert no prejudicial stress on the obstacle E.

If both driven members tend to accelerate, the obstacles C and E move first so that the balls 69 and 70 are then both unlocked and can slide in their slideways 67, 68, in such a manner that the movement will continue until the device becomes locked in the position corresponding to the driving of the engine by the wheels. The invention includes the utilisation of an irreversible mechanism of this kind as connection between the locking members in any other free wheel differential for obtaining a similar result.

Figure 7:
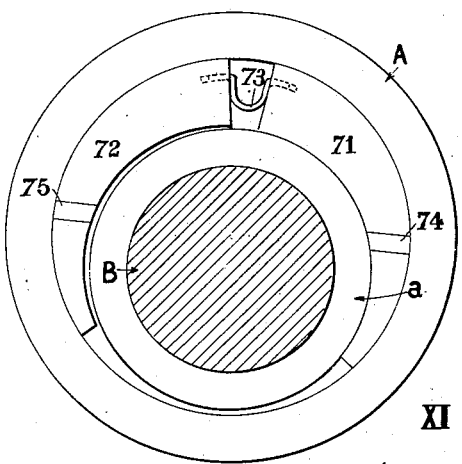
Figs. 7 and 8 are cross sections of two other embodiments of the mechanism.

Fig. 7 shows that for each free wheel both opposite wedges such as 71 and 72 can be spaced apart by a spring 73 and can abut through a finger 74 or 75 on a corresponding finger of the reverse wedge (not shown) of the other free wheel, as in the case of Figs. 1 to 4. Said spring 73 ensures at the same time the friction of the wedges on the drum for initiating the engagement.

In the same way as in Figs. 1 to 4, the eccentric bosses of the member B (one of which only is shown) will be in this case offset to the extent of 180 degrees.

Figure 8:
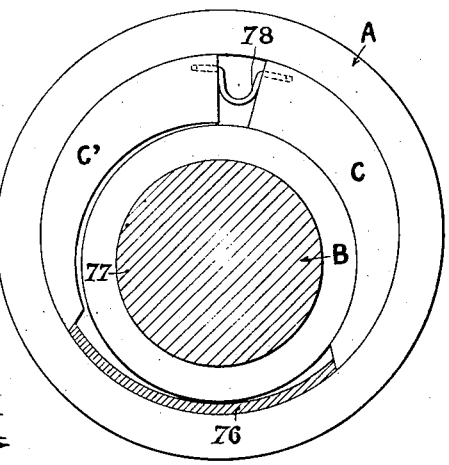

Fig. 8 shows another modification according to which a single, movable and independent abutment 76 in the shape of an arc of circle, is interposed between the thin ends of the wedges CC' of the free wheel illustrated and the wedges EE' of the free wheel (not shown) which is behind the first one, said wedges and the respective bosses 77 of member B being then set, no longer at 180 degrees, but according to one and the same direction. The circumferential length of said abutment is such that the wedges C and E can only move to locking position when the opposite wedges C' and E' are already unlocked and vice versa. The ends of the abutment 76 are bevelled as well as the ends of the wedges so as to cooperate with the thrust exerted by spacing springs 78 for urging the wedges to press against the drums A and D. An intermediate movable independent abutment of this kind could control the wedges of any number of free wheels, particularly if there are more than two driving wheels.

As the locking of one wedge only, prevents all the other wedges of reverse direction from engaging, it is sufficient that one wheel should remain a driving wheel for all the others to be able to freely accelerate.

The invention includes the application of the various connections between the wedges above described, to all other free wheel differentials having a positive driving action comprising similar wedges and in particular to differentials utilising the free wheels of the type described in the French Patent No. 813,779.

Figs. 9 to 11 illustrate a differential in which the connection of the driving member B to each of the driven members A and D is obtained by means of one-way driving devices the driving direction of which can be reversed by interposing between the driving member and the unit composed of said driving devices, a connection comprising two members moving relatively to each other when the direction of the stresses transmitted changes, the relative displacement of said members determining, through the medium of a suitable control, the driving direction of the unit composed of the one-way driving devices, in such a manner that it corresponds to the direction of the stress transmitted.

In this example of construction, the member B is constituted by a plate 80 rigid with a shaft 81 and carrying two eccentric bosses 82, 83 offset to the extent of 180 degrees; said plate is surrounded by a driving toothed crown wheel 84 and comprises notches 80a in which are engaged with play bosses 84a of the crown wheel 84.

The members A and D are constituted by drums 85 and 86 rotating on the ends of shaft 81 and within the crown wheel 84.

Around the eccentric bosses 82, 83 are mounted collars 87, 88 each of which is coupled to the respective drum 85 or 86 by a finger 89 sliding in a radial groove 90 formed in the drum.

The pairs of wedges 91, 92 and 93, 94 placed between the collars 87, 88 and the rims of the drums 85, 86 are subjected to the action of spacing springs 95, 96 and carry lateral bosses 97, 98, 99, 100 respectively. For controlling these wedges, members are provided in the shape of kidneys 101, 102, 103, 104 pivotally mounted in the recesses of the plate 80 and the ends of which cooperate, some with the respective bosses 97, 98, 99, 100, the others with the faces 105, 106, 107, 108 of bosses 109, 110 rigid with the crown wheel 84.

When the driving crown wheel 84 rotates in the direction of the arrow $f$ the bosses 109 and 110 act on the members 102 and 104 putting out of action the wedges 92 and 94 so that in a turn, the outer wheel can freely accelerate as long as the inner wheel exerts a resistance. On the contrary, if both wheels tend to accelerate simultaneously, if, when passing to reverse running, the crown wheel 84 moves relatively to the plate 80 owing to the reversal of the direction of the stresses, in such a manner that the wedges 92 and 94 will engage, whereas the wedges 91 and 93 will be put out of action in their turn.

Consequently, the mechanism operates in the same way for reverse and for forward running and moreover allows the engine to be driven by the wheels, one of which in this case, being capable of slowing down in a turn. The control of the wedges can be adjusted in such a manner that all the wedges are engaged when the bosses 84a are in the middle of the notches 80a. In this case, there is no need to ensure the initiation of the engagement, but the differential movement may not be able to take place when no stress is exerted on the transmission.

If all the wedges are put out of action when the bosses 84a are in the mean position, it is preferable to ensure the engagement by means of devices exerting a sufficient friction for initiating the engagement. Said friction can be exerted for instance between the wedges and the members A or $a$ (or D or $d$) or between the member B on the one hand and the members A or D on the other hand. An intermediate solution which seems advantageous consists in arranging the controls of the wedges in such a manner that in the mean position of bosses 84a both wedges C and C' for instance are out of action whereas the wedges EE' are both locked. According to Fig. 11 this result is obtained by giving the boss 109 a thickness greater than that of boss 110. In these conditions the kidney-shaped members take a bearing on the plate 80 rendered rigid with the drum D and the engagement is always ensured, the differential movement however remaining always possible when the bosses 84a are in the mean position, the drum A freely rotating in both directions of rotation.

When a stress is exerted on the transmission, the displacement of the crown wheel 84 relatively to the plate 80 reestablishes symmetry of operation between both drums A and D.

The invention includes the application of said mechanism controlling the driving direction utilising the relative displacement of two members according to the direction of the stresses, to any other differential equipped with any kind of free wheels for obtaining an equivalent operation. Among these applications can be cited for instance:

(a) The control of wedges in other types of differentials having a positive driving action and more particularly in differentials utilising the free wheels of the kind described in the French Patent No. 813,779;

(b) The control of the balls or rollers or of their cages in buttressing differentials;

(c) The control of pressure rings in differentials with clutching by means of simple or multiple discs, or by cones;

(d) The putting out of action of pawls or other equivalent members in the free wheel differentials with pawl and ratchet device;

(e) The control of cocks, distributors, valves, etc., reversing the driving direction in differentials utilising hydraulic free wheels in which a liquid prevents, in a given direction, the relative movement of the two driving and driven members and can freely circulate in the reverse direction.

I claim:

1. A differential comprising a normally driving member having portions in the shape of cams, at least two normally driven members co-axial relatively to said driving member, auxiliary members positively rotatively connected respectively to said driven members, each of said driven members and respective auxiliary members having surfaces adapted to move towards each other under the thrust of said cams of the driving member when a difference of speed takes place between the driving member and said driven member, wedges of reverse directions adapted to positively prevent said surfaces of the driven and auxiliary members from moving towards each other so as to thereby render the driving member rotatively rigid with the driven members in each direction of rotation, and abutments adapted to ensure the free rotation of the driven members in a given direction relatively to the driving member by putting out of action the corresponding wedges as long as one of said driven members exerts on the normally driving member, even if the latter is used as brake, a stress directed in reverse direction to said given direction.

2. A differential as claimed in claim 1, in which the putting out of action of the wedges is ensured by connection means provided between the wedges of reverse directions, adapted to prevent them from being simultaneously set in action.

3. A differential comprising a normally driving member having two eccentric bosses, two normally driven members in the form of drums concentric with the axis of rotation of said driving member, two auxiliary members in the shape of rings having concentric surfaces and rotatively mounted on said bosses of the driving member, said auxiliary members being positively rotatively connected to the respective driven members whilst having, relatively to the latter, the freedom of movement necessitated by the eccentricity of said bosses, two pairs of wedges in the shape of curved chocks respectively placed between each of the driven members and the respective auxiliary member, and abutments adapted to ensure the free rotation of the driven members in a given direction relatively to the driving member by the putting out of action of the corresponding wedges as long as one of said driven members exerts on the normally driving member, even if the latter is used as brake, a stress directed in reverse direction to said given direction.

4. A differential as claimed in claim 3, in which each of said auxiliary members in the shape of a ring is rotatively connected to the respective driven member by a finger rigid with one of said members and sliding in a groove of the other member.

5. A differential as claimed in claim 1, in which said wedges are constituted by curved quoins, and said driven members are formed by drums, in combination with intermediate curved blades arranged for connecting in pairs said curved quoins, these quoins being mounted with great friction in said drums.

6. A differential as claimed in claim 1, in which the wedges are constituted by curved quoins connected in pairs by means of an intermediate curved blade, each pair of wedges being provided with lateral abutment fingers allowing to couple it with slight play with the other pair of wedges.

7. A differential as claimed in claim 1, in which the wedges are constituted by curved quoins connected in pairs by means of an intermediate curved blade, one pair of wedges bearing laterally two spring blades pressing against a boss provided on the other pair of wedges.

8. A differential as claimed in claim 1, in which the driving member comprises a cheek member, the wedges being placed on either side of said cheek member, each of the wedges carrying at least two inclines of reverse directions and having plane faces extending from the apex of said inclines, said driving member being perforated with apertures in which are freely housed balls arranged for cooperating with said inclined and plane faces.

HENRI LEON MARIE JOSEPH DE PLACE.